United States Patent
Guo et al.

(10) Patent No.: US 7,362,723 B2
(45) Date of Patent: Apr. 22, 2008

(54) WIRELESS ROUTING MECHANISM FOR SAME GROUP AND INTER-GROUP OPERATIONS COVERING BOTH WIRE NETWORK AND WIRELESS NETWORK

(75) Inventors: Ming-Wang Guo, Hsinchu (TW); Jen-Sheng Huang, Hsinchu (TW); Chun-Fu Wang, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 240 days.

(21) Appl. No.: 11/198,179

(22) Filed: Aug. 8, 2005

(65) Prior Publication Data

US 2007/0030823 A1 Feb. 8, 2007

(51) Int. Cl.
*H04Q 7/00* (2006.01)
(52) U.S. Cl. ............... 370/328; 370/338; 370/326; 455/453
(58) Field of Classification Search ............ 370/328, 370/326, 338, 342, 343, 400, 471, 472, 406, 370/254, 203; 375/347; 455/453
See application file for complete search history.

(56) References Cited

U.S. PATENT DOCUMENTS

| | | | | |
|---|---|---|---|---|
| 2004/0199668 | A1* | 10/2004 | Lin et al. ............... | 709/241 |
| 2006/0164969 | A1* | 7/2006 | Malik et al. ............ | 370/203 |
| 2006/0252443 | A1* | 11/2006 | Sammour et al. ........ | 455/518 |
| 2007/0198739 | A1* | 8/2007 | Jennings et al. ........ | 709/231 |

* cited by examiner

Primary Examiner—Tan Trinh
(74) Attorney, Agent, or Firm—Bacon & Thomas, PLLC

(57) ABSTRACT

The present invention is to provide a wireless routing mechanism by applying a management frame defined in IEEE 802.11 standard to different access points (AP) in a wireless distribution system (WDS) and adding an information element (IE) to the management frame, enabling any AP to be capable of maintaining the integrity of IE based on its own setting and state, determining other APs' operations in WDS based on a received IE and determining whether a physical link (i.e., wireless link) between itself and any of other APs should be established to provide a channel for sending data frames therebetween and automatically establishing a stable, flexible and expansible wireless network topology in a wire network infrastructure based on information contained in a plurality of fields of the IE.

59 Claims, 13 Drawing Sheets

WIRELESS ROUTING MECHANISM FOR SAME GROUP AND INTER-GROUP OPERATIONS COVERING BOTH WIRE NETWORK AND WIRELESS NETWORK

FIELD OF THE INVENTION

The present invention relates to wireless routing mechanisms, more particularly to a wireless routing mechanism capable of applying a management frame defined in IEEE 802.11 standard to different access points (AP) and adding an information element (IE) to the management frame in order for automatically establishing a stable, flexible and expansible wireless network topology in a wire network infrastructure based on information contained in a plurality of fields of the IE.

BACKGROUND OF THE INVENTION

Wireless network has many advantageous features and is thus capable of eliminating many drawbacks of wire network. Recently, network topology systems based on IEEE 802.11 wireless networking have become the trend of current wireless network development. Such trend is significant in the point of how to develop wireless topology systems based on interconnection of access points (APs). However, no standard for IEEE 802.11 wireless networking based network topology has been published by IEEE because IEEE did not anticipate that IEEE 802.11 will develop so quickly at the time of publishing IEEE 802.11. Further, no relevant draft has been initiated yet. Thus, many network service providers have begun to develop their own wireless network topology systems.

There are significant differences in terms of physical features between a wire network and a wireless network. Services provided by a wireless network are different from that provided by a wire network. Also, a number of potential problems exist when a wireless network and a wire network integrate. Most of wireless topology systems developed by the network service providers cannot satisfy needs of vast users. The wireless topology systems are not flexible as compared with wire topology systems. Moreover, many problems about network establishment, topology establishment and maintenance, and network management are yet solved. Such problems also exist and are yet solved in developing wireless topology systems in a wireless distribution system (WDS).

For services provided to conventional wireless stations (STAs) by APs, they gradually cannot either satisfy needs of vast users or meet expectations of enterprises. Thus, it is desirable to improve AP such that different APs can connect together via WDS and even become a part of network equipment. WDS is part of IEEE 802.11 standard and is adapted to provide a mechanism for interconnecting APs in a network infrastructure. Typically, interconnecting APs in WDS is done manually by setting media access control (MAC) address in order to determine an established physical link topology between APs. However, such topology is neither flexible nor expansible in terms of structure. Moreover, the whole wireless topology may malfunction or create a loop when one AP is offline or power off. As a result, network interrupt occurs. Facts are that no standard is published for regulating the known WDS operations. Also, some WDSs cannot effectively cooperate with existing Ethernet. Moreover, WDS topology establishment is also complicated and inflexible when wire network is not under consideration. There is a rapid spanning tree protocol (RSTP) as IEEE 802.11 industry standard. RSTP is adapted to automatically develop a practical network topology with respect to Layer 2 based on a wire link established by network switch. RSTP was employed in wire networking and is adapted to dynamically create a topology with respect to Layer 2 having established wire link. However, RSTP was not employed in wireless networking because there are significant differences in terms of physical features between a wire network and a wireless network, a wireless network cannot dynamically provide the current wireless link to RSTP, and RSTP cannot create a network topology without loop accordingly. Thus, a need for improvement exists.

SUMMARY OF THE INVENTION

In view of the prior drawback of impossible of integrating AP with a wire network discussed in the related art after considerable research and experimentation with respect to AP, a wireless routing mechanism for same group and inter-group operations covering both a wire network and a wireless network according to the present invention has been devised. By utilizing the novel network negotiation mechanism, different APs are adapted to operate in WDS for quickly and automatically forming a network topology having advantages of being flexible, eliminating detail setting with respect to each AP, having improved network performance, integrating with existing wire network, and fulfilling the needs of constructing intranet and metropolitan area network by APs.

It is therefore an object of the present invention to apply a management frame defined in IEEE 802.11 standard with respect to AP in WDS. The management frame comprises an information element (IE) including an Element ID field for storing an ID of the IE, a Length field for storing a total length of the IE; a Current Group ID (CGID) field for representing a group ID of one AP when the wireless routing mechanism performs such that other APs are adapted to be aware of whether a specific group exists and operates, a Role of AP field for representing a current role of the AP when the wireless routing mechanism performs, a Hello field for representing which role of an AP is when the AP is sending the IE, a Sequence field for representing a sequence number of a latest available IE and for indicating an existence of a specific group, and a MACofRootAP field for representing a MAC value of a root AP in the group. In the fields, only one of the Hello field and the Role AP field is selected as a requisite field. In the wireless routing mechanism, any AP is required to maintain the integrity of IE based on its own setting and state in order to appropriately send the IE by the management frame such that state of itself in WDS can be provided. In such a manner, any AP is able to determine other APs' operations in WDS based on a received IE. Next, the AP can determine whether a physical link (i.e., wireless link between APs) between itself and any of other APs should be established. The physical link provides a channel for sending data frames between two different APs. Thus, any AP is able to wirelessly maintain the channel between APs via the management frame. Also, any AP is able to determine the existence and necessity of the channel. By utilizing this, drawback of lacking features of wire networking as associated with wireless networking is eliminated and disadvantage due to different transmission media is eliminated.

It is another object of the present invention to add a Default Group ID (DGID) field in the IE for representing a group ID of a group that an AP desires to enter. However, in practice a default group is not necessary to be the last added group. To the contrary, DGID is simply a priority reference such that different APs with the same DGID have the highest priority of establishing a wireless link therebetween. Different APs with different DGIDs also can establish a wireless link in a specific mode. Next, a new designated wireless link is formed automatically. By utilizing this, the purposes of real time maintenance and dynamic, automatic repair of a damaged wireless topology are achieved.

It is yet another object of the present invention to cause the Role of AP field to represent a role played by an AP in a specific group, the role including a Root AP for indicating an AP being in a state of connecting to the wire network and enabling the AP to provide services to the subsequent disconnected APs for establishing a wireless link, a Backup Root (or simply Backup) AP for indicating an AP being in a state of connecting to the wire network and disabling the AP to provide services to the subsequent disconnected APs for establishing a wireless link, a Pure AP for indicating an AP being in a state of disconnecting from the wire network and causing the AP to connect to the wire network via services provided by other Root APs, an Escape Pure (or simply Escape) for indicating an AP being in a state of connecting to a wire network via other APs having different DGID fields, and an Initial Pure (or simply Initial) AP for indicating an AP being in a state having a role being transient. At this time, the AP has not established a wireless link or the established wireless link has interrupted. After any AP receiving a probe request frame sent from another AP and being aware that a change of role played by another AP by analysis, the AP thus can replace the role played by another AP depending on the real condition, provide services to subsequent disconnected APs for establishing a wireless link, dynamically prevent a loop from creating in real time, enable wireless links among APs of the group to quickly converge, and hasten topology growth. Moreover, a backup mechanism is activated immediately when the topology is tampered. As a result, a Root AP is created in real time for automatically repairing damaged topology, and providing wireless link services to subsequent Pure APs. In addition, in a single group state in response to disabling an AP from receiving a management frame from another AP or vice versa due to certain reasons and thus interrupting information exchange therebetween, and in response to both APs regarding themselves as eligible Root APs, both APs can communicate management frame via a wire network for information exchange therebetween. Additionally, a value of the Sequence field is adapted to enable the AP receiving the management frame to negotiate for obtaining a unique Root AP based on whether the value of the Sequence field of the IE is more senior. By utilizing this, the network topology of the system may quickly converge and stabilize.

It is a further object of the present invention to add a RunOutofVport field in the IE for representing whether an AP is capable of establishing one or more physical wireless links. Whether one or more new wireless links should be established depends on the number of established links. Thus, it is clear that the present invention can limit the number of wireless links according to characteristics and requirements of respective APs and average the number of AP links. As an end, load is balanced and the purpose of effectively utilizing bandwidth is achieved.

It is yet further object of the present invention to add an Escape field in the IE for representing whether an AP is capable of accepting to establish a wireless link with another AP having a different DGID. It is adapted to facilitate management by network staff. It is comprises three modes including an acceptable escape mode, an unacceptable escape mode, and all APs in the same group being in unacceptable escape mode. The third mode is not required to set all APs in the same group. To the contrary, a root AP may inform other APs via IE. By utilizing this, it enables respective APs to have the right of selecting service target. That is, enables the APs having different attributes to have the right of selecting service target or not. Eventually, the present invention can easily configure all APs in a single group to not provide services to APs having different attributes, thereby forming a private wireless network system.

The above and other objects, features and advantages of the present invention will become apparent from the following detailed description taken with the accompanying drawings.

DETAILED DESCRIPTION OF THE INVENTION

Figure 1:
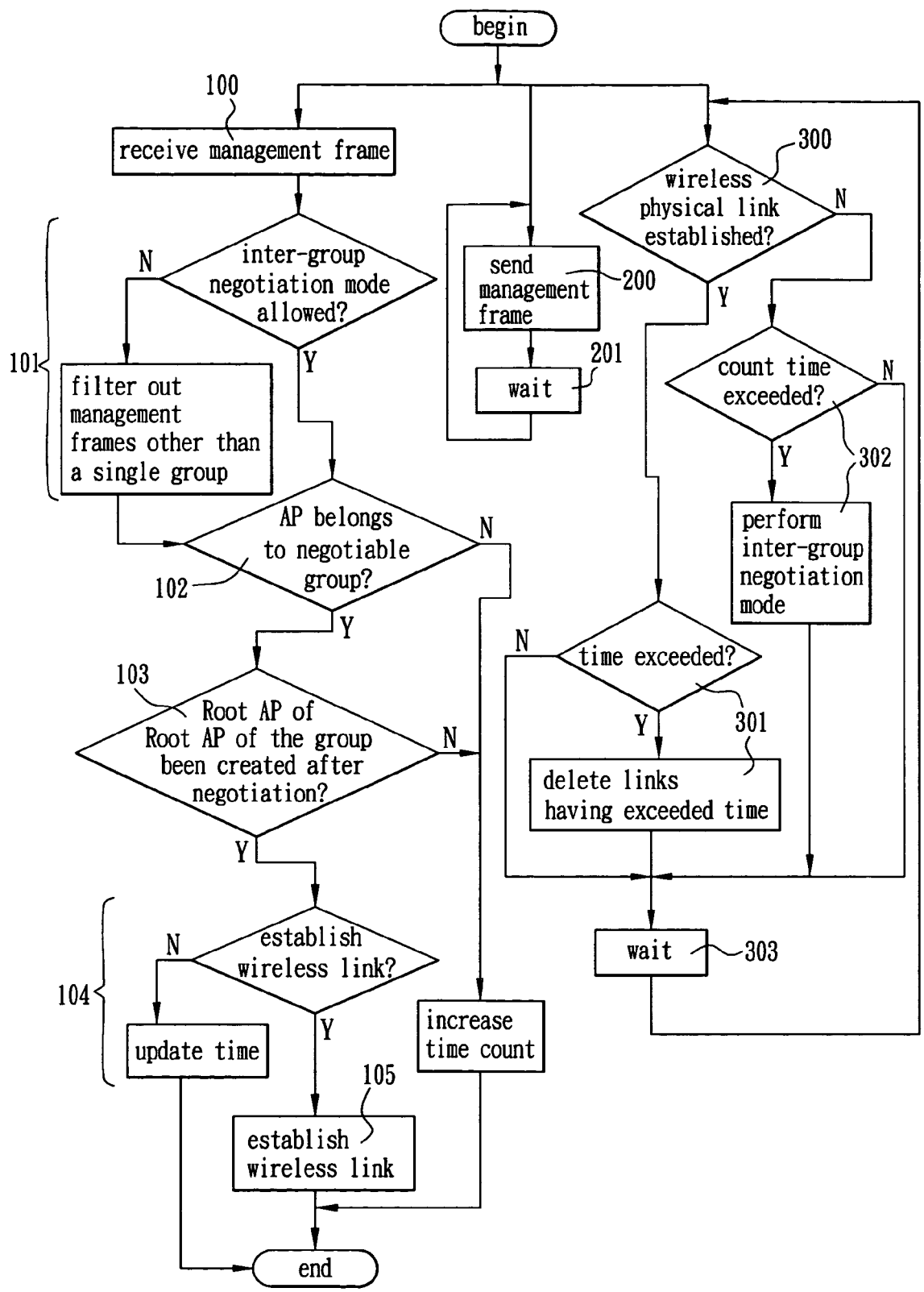
FIG. 1 is a flowchart depicting steps performed after an AP has been activated according to the invention.

In IEEE 802.11 standard, three types of frame are defined. Namely, management frame, data frame, and control frame. The management frame serves as a communication frame between an AP and a STA. That is, communication between an AP and a STA is made possible via the management frame in order to then determine whether a link should be established. The invention applies management frame features to different APs based on management frame functionalities such that a link between any two APs (i.e., wireless link between APs) thus can be established. The management frame is adapted to communicate based on an information element (IE) contained therein. Thus, an AP must maintain the integrity of IE based on setting and states itself in order to appropriately send IE by management frame. Thus, as contemplated by the invention an added IE is adapted to provide a WDS state to AP. Any AP is able to determine other APs' operations in WDS based on received IE. Next, the AP can determine whether a physical link between itself and any of other APs should be established. Also, the AP is able to maintain the state in real time with respect to established physical link.

In a wireless routing mechanism of the invention after a first AP is activated, the first AP may regularly send a probe request frame by broadcasting. Also, a new IE is added in the probe request frame. Alternatively, the IE can send a probe request frame via another management frame. IE can not only declare itself as an AP capable of supporting the wireless routing mechanism of the invention but also send a current state of itself in real time. All APs supporting the wireless routing mechanism of the invention can receive the probe request frame, analyze information provided by the IE, and store the real time information in a bridge table (BT) since the probe request frame is a broadcast frame. At this time, a probe response is sent back as a response to the probe request sent from the first AP when a second AP receives the probe request frame. At the time of negotiation finish, whether a wireless link between first and second APs should be established can be decided. A probe request frame is sent regularly between two APs. Thus, the APs can determine whether a wireless link exists based on the probe request frame. Thereafter, the APs can establish a new topology through RSTP or any known topology growth protocol. In other embodiments of the invention the second AP may send a response probe in a manner other than above as a response to the probe request sent from the first AP when the second AP receives the probe request frame.

For achieving the purpose of enabling each AP to determine whether a wireless link should be established based on received ID, the invention first defines fields in an added IE as detailed below.

a) Element ID field: It is a requisite field according to IEEE standard. It is a first field of IE, has a length of 1B, and is adapted to store ID of IE. Contents of Element ID field must be different from any used ID.

b) Length field: It is a requisite field according to IEEE standard. It is a second field of IE, has a length of 1B, and is adapted to store total length of IE, i.e., store the number of bytes accumulated from a third field to the last field of IE.

c) Default Group ID (DGID) field: It is an added field, has a fixed length, and is adapted to represent a group ID of a group that an AP desires to enter. That is, a group has a group ID with the highest priority of entering. However, in practice a default group is not necessary to be the last added group. To the contrary, DGID is simply a priority reference. Thus, this field is not a requisite field. In other words, different APs with the same DGID have the highest priority of establishing a wireless link therebetween. As a result, an infrastructure of groups is established. Different APs with different DGIDs also can establish a wireless link in a specific mode. In the wireless routing mechanism of the invention, each of all APs has its own DGID and which can be set by user. In view of this feature, it means that each AP has the highest priority of entering a specific AP group.

d) Current Group ID (CGID) field: It is an added field, has a fixed length, and is adapted to represent a group ID of an AP when the wireless routing mechanism of the invention performs. As such, other APs may be aware of whether a specific group exists and operates. Thus, it is a requisite field. In the wireless routing mechanism of the invention, each of all APs eventually enters a specific group and ID of the specific group is CGID.

e) Role of AP field: It is an added field, has a fixed length, and is adapted to represent a current role of AP when the wireless routing mechanism of the invention performs. Only one of Role of AP field and Hello field is selected as a requisite field. In the wireless routing mechanism of the invention, each of all APs has its own default role and which is set by user. In view of this feature, it means that each AP has the highest priority of playing the role in a specific AP group.

The default role comprises the following five types:

(1) Root AP: It means an AP is in a state of connecting to a wire network. The AP thus can provide services to subsequent disconnected APs for establishing a wireless link.

(2) Backup Root (or simply Backup) AP: It means an AP is in a state of connecting to a wire network. But the AP cannot provide services to subsequent disconnected APs for establishing a wireless link.

(3) Pure AP: It means an AP is not in a state of connecting to a wire network. The AP thus has to connect to a wire network via services provided by other Root APs.

(4) Escape Pure (or simply Escape) AP: It means an AP is in a state of connecting to a wire network via other APs having different DGID fields.

(5) Initial Pure (or simply Initial) AP: It means an AP is in a state having a role being transient. At this time, the AP has not established a wireless link or the established wireless link has interrupted.

f) Hello field: It is an added field, has a fixed length, and is adapted to represent which role of AP is when the AP is sending IE. Only one of Hello field and Role AP field is selected as a requisite field.

g) RunOutofVport field: It is an added field, has a fixed length, and is adapted to represent whether an AP can establish a new wireless link. That is, it indicates whether an AP has the capability of establishing more physical wireless links. Whether one or more new wireless links should be established depends on the number of established links. This is for the purpose of balancing load. Thus, it is not a requisite field.

h) Sequence field: It is an added field, has a fixed length, and is adapted to represent a sequence number of a latest available IE and thus indicate existence of a specific group. In other words, count of Sequence field is increased by one when root AP sends a management frame having an IE. Other APs in the same group may take a maximum value of the received field as content to be sent. Thus, it is a requisite field.

i) MACofRootAP field: It is an added field, has a fixed length, and is adapted to represent MAC value of root AP in the AP group. MAC value is non-repetitive and is fixed. Thus, it is a requisite field.

j) Channel field: It is an added field, has a fixed length, and is adapted to represent an operating channel of a group. Similar channels exist in other management frames. Thus, it is not a requisite field.

k) AP Management Name field: It is an added field, has a variable length depending on length of a set name, and is adapted to represent an AP name used when mashing with other APs is performed. It is simply a field for facilitating management by network staffs. Thus, it is not a requisite field.

l) Escape field: It is an added field, has a fixed length, and is adapted to represent whether an AP can accept to establish a wireless link with another AP having a different DGID. It is simply a field for facilitating management by network staff. It is an attached field and has the following modes:

(1) Acceptable escape mode;
(2) Unacceptable escape mode; and
(3) All APs in the same group are in unacceptable escape mode in which it is not required to set all APs in the same group in the mode. To the contrary, a root AP may inform other APs via IE of the invention. This mode has higher priority as compared with other two modes.

Note that in the fields described above only Element ID field and Length field are sequential and fixed order among the remaining fields is permitted. As to length of each of the above fields, only Element ID field and Length field have fixed lengths and the remaining fields have variable lengths depending on applications. Further, IE defined by the invention consists of a plurality of the above fields. But in practice it is contemplated by the invention to configure each IE to have information about one or more fields depending on needs or convenience.

It is clear from DGID field and CGID field defined by the invention, the idea of group is added in the wireless routing mechanism of the invention and the purpose thereof is to enable different APs to determine attributes of AP based on IE contained in the management frame. Thereafter, whether a physical link to be established can be decided based on attribute negotiation. APs in the group have attribute adapted to negotiate in nature. Thus, such determination can stop excessive expansion of wireless network topology, greatly decrease complexity of wireless network topology, and prevent transfer performance from decreasing due to excessive expansion of wireless network topology. Moreover, it is understood that APs in different geographical areas must have different attributes and transfer quality. Thus, bandwidth of wireless network can be effectively employed if APs having a great attribute difference therebetween are not allowed to establish a physical link directly.

The RunOutofVport field defined by the invention can provide a mechanism of enabling a plurality of APs in the same group to access a wire network simultaneously. But for preventing routing from occurring when a plurality of APs have access to a wire network simultaneously, preferably one of the APs having wire network access is automatically assigned as a Root AP by referring to the Sequence fields in IEs in order to maintain and send a routing frame over network. As an end, topology of wireless network and topology of wire network are fully integrated and are fully compatible therebetween. Remaining APs of the same group having wire network access are assigned as Backup Root APs and which are adapted to filter and delete routing frames and determine the state of a Root AP in real time based on management frames sent from remaining APs in the same group. Preferably, another one of the APs having wire network access is automatically assigned as a new root AP by referring to the Sequence fields in IEs if either the state of the previous Root AP has changed based on determination or a predetermined time has elapsed without sending a management frame from the same group. According to this rule, APs of the same group can interrupt wireless network link based on Role of AP field (or Hello field) and the Sequence field change in the latest IE. Further, state of the latest role is taken as basis of determining whether a new physical link is to be established. As such, loop can be eliminated in the newly established wireless network topology.

Those APs in the same group not having wire network access are assigned as Pure APs and which are able to receive management frame from the group in real time. Thus, once activated Pure APs are adapted to immediately negotiate with other APs in the same group. Further, a wireless physical link is either established or limited based on the negotiation. Furthermore, the old wireless physical link is interrupted if a new Root AP in the group is created after negotiation. IE of the newly received management frame is taken as a basis of establishing a new physical link. In view of above, the wireless routing mechanism of the invention can monitor state changes of the same group in order to dynamically, reliably maintain a normal operation of all APs in the same group in real time. Further, the wireless routing mechanism of the invention can deal with an adverse wireless link interrupt effect due to offline of one AP in the same group and fulfill the needs of establishing a new wireless link due to an added AP in the same group.

Moreover, for providing more applications the invention defines an Escape field for indicating whether an AP is willing to establish a link with another AP having a different DGID for the purpose of facilitating management by network staff. Thus, an AP is adapted to adjust its own attribute and state, perform an inter-group negotiation, negotiate with APs of other groups, and temporarily enter another group (i.e., new group) for receiving a management frame sent from an AP of the new group in response to special state of the group. In addition, IE of the management frame is taken as basis of establishing a physical link. Once a physical link is established with the new group, the AP becomes a part of the new group topology.

Channel field defined by the invention is adapted to represent an operating channel of a group. Thus, an AP not only can provide both WDS and STA functions in a single bandwidth at the same time but also can provide both WDS and STA functions in different bandwidths. As a result, dual band service mode is provided, bandwidth is fully used, interference is decreased to a minimum, and wireless network performance is greatly improved.

Referring to FIG. 1, it is a flowchart depicting three procedures performed after an AP has been activated according to the wireless routing mechanism of the invention. By performing these procedures, a physical link with other APs can be established and a real time maintenance of state of the established physical link can be effected.

Procedure I: Receive each management frame sent from other APs and process same by performing the following steps:

(100) Receive a management frame sent from any of other APs and analyze information contained in its IE.

(101) Determine whether performing an inter-group negotiation mode is allowed. If yes, the procedure goes to the next step. Otherwise, filter out all management frames other than a single group prior to going to the next step.

(102) Analyze the management frame and determine whether AP of sending the management frame belongs to APs of a negotiable group. If yes, the procedure goes to the next step. Otherwise, increase time count by one prior to ending the procedure (i.e., processing of management frame).

(103) Analyze the group and determine whether a Root AP of the group has been created after negotiation. If yes, the procedure goes to the next step. Otherwise, increase time count by one prior to ending the procedure (i.e., processing of management frame).

(104) Determine whether a wireless link with an AP sending the management frame is necessary to be established. If yes, the procedure goes to the next step. Otherwise, update time of the latest received management frame prior to ending the procedure (i.e., processing of management frame).

(105) Establish a wireless link with the AP sending the management frame and update time of the latest received management frame prior to ending the procedure (i.e., processing of management frame).

Procedure II: Process a management frame sent from any of other APs by performing the following steps:

(200) Send a management frame to any of other APs.

(201) Loop back to step 200 after waiting a predetermined period of time.

Procedure III: Maintain a wireless physical link in real time by performing the following steps:

(300) Determine whether a wireless physical link has been established. If yes, the procedure goes to the next step. Otherwise, jumps to step 302.

(301) Determine whether time of receiving a latest management frame for maintaining all physical links has exceeded a predetermined period of time. If yes, deletes the links having exceeded the predetermined period of time and next jumps to step 303. Otherwise, jumps to step 303.

(302) Determine whether time count has exceeded the predetermined period of time. If yes, allows AP to perform an inter-group negotiation mode and resets time count prior to going to the next step. Otherwise, goes to the next step.

(303) Loop back to step 300 after waiting a predetermined period of time.

For further explaining principles and performance of the invention, a plurality of preferred embodiments are described in conjunction with the accompanying drawings as below.

Figure 2:
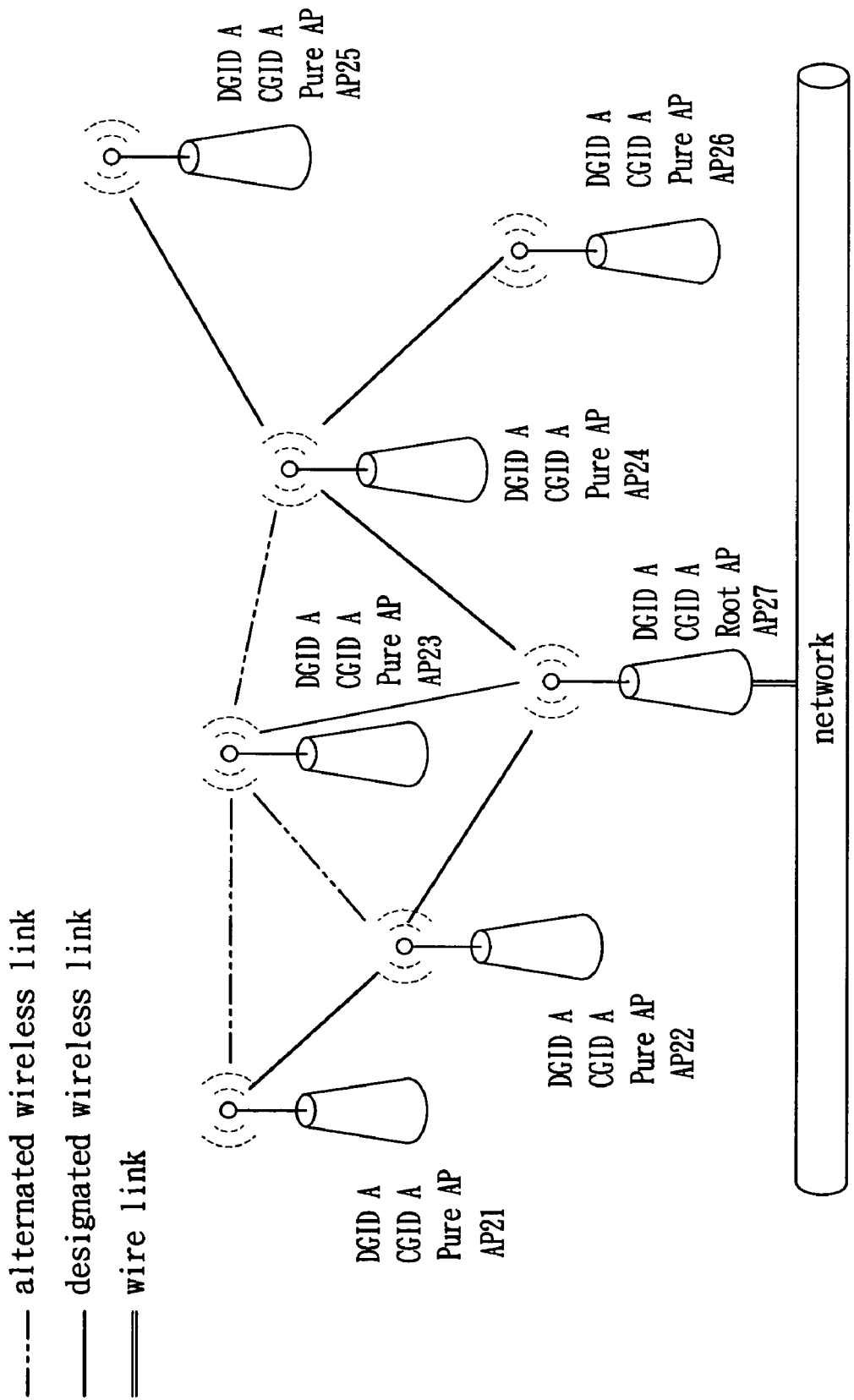
FIG. 2 schematically depicts topology growth among APs in a single group state according to a first preferred embodiment of the invention.

Referring to FIG. 2, a first preferred embodiment of the invention is shown in which the wireless routing mechanism is applicable to a single group state. As shown in FIG. 2, each AP is labeled with DGID, CGID, AP roles of stable topology (e.g., Pure AP and Root AP), and serial numbers of APs (e.g., AP21, AP22, and AP27) in which only AP27 is connected to a wire network (e.g., Ethernet). For any activated AP, its role is Initial AP. After AP27 receiving a management frame from any of other APs, AP27 may analyze an added IE therein and change its role as Root AP after determining that there is no Root AP in the APs. Attribute negotiation between any two APs is done by analyzing a probe request frame sent from each AP. For example, AP24 may establish a wireless link with AP27 because it has a DGID the same as that of AP27. Similarly, other wireless links can be established accordingly. The number of wireless links is thus increased. Each AP may form more than one wireless link. However, for the sake of preventing a loop from creating, each AP may decide which wireless links belong to ones capable of sending frames and the remaining wireless links belong to ones incapable of sending frames based on functionality of its own bridge. In the embodiment of the invention, wireless links capable of sending frames are defined as designated wireless link and wireless links incapable of sending frames are defined as alternated wireless link. Thus, all APs shown in the first embodiment grow and eventually form a stable topology which is not only compatible with existing wire network but also is integrated therewith. As such, no detail setting with respect to each AP is required and easy installation is effected.

Figure 3:
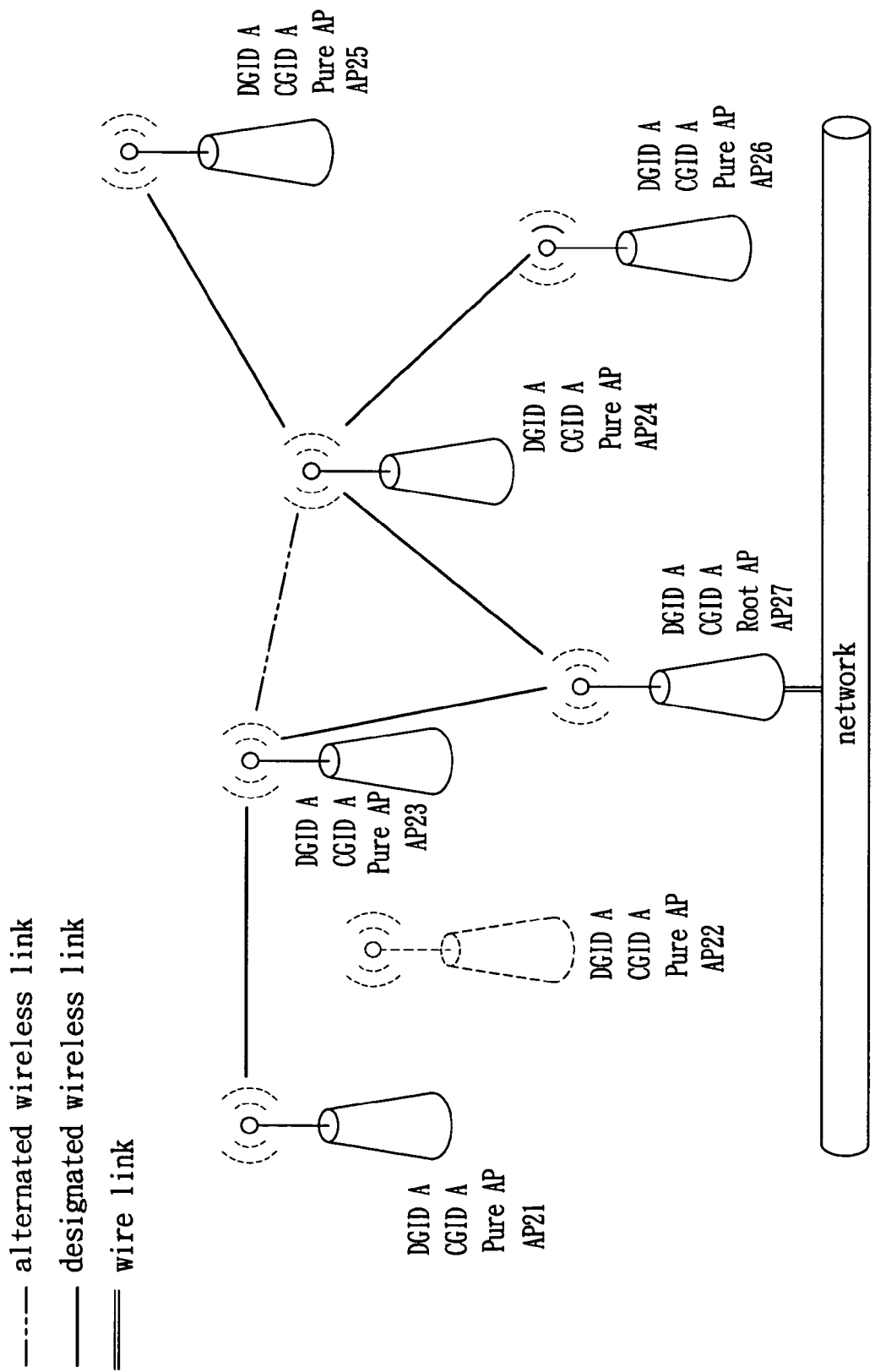
FIG. 3 schematically depicts topology growth among APs in a single group state according to a second preferred embodiment of the invention.

Referring to FIG. 3, a second preferred embodiment of the invention is shown. Other APs within the communication range cannot receive a probe request frame sent from AP22 when AP22 in the first embodiment leaves the single group state due to deactivation or other reasons. Thereafter, other APs having an established designated wireless link or alternated wireless link with AP22 will interrupt old wireless links. Thus, three old wireless links with AP22 (see FIG. 2) are interrupted (see FIG. 3). Thus, AP22 does not have the role of Root AP. Next, AP21 automatically becomes a new designated wireless link because it detects that AP22 has left. As an end, the purposes of real time maintenance and dynamic, automatic repair of a damaged wireless topology are achieved.

Figure 4:
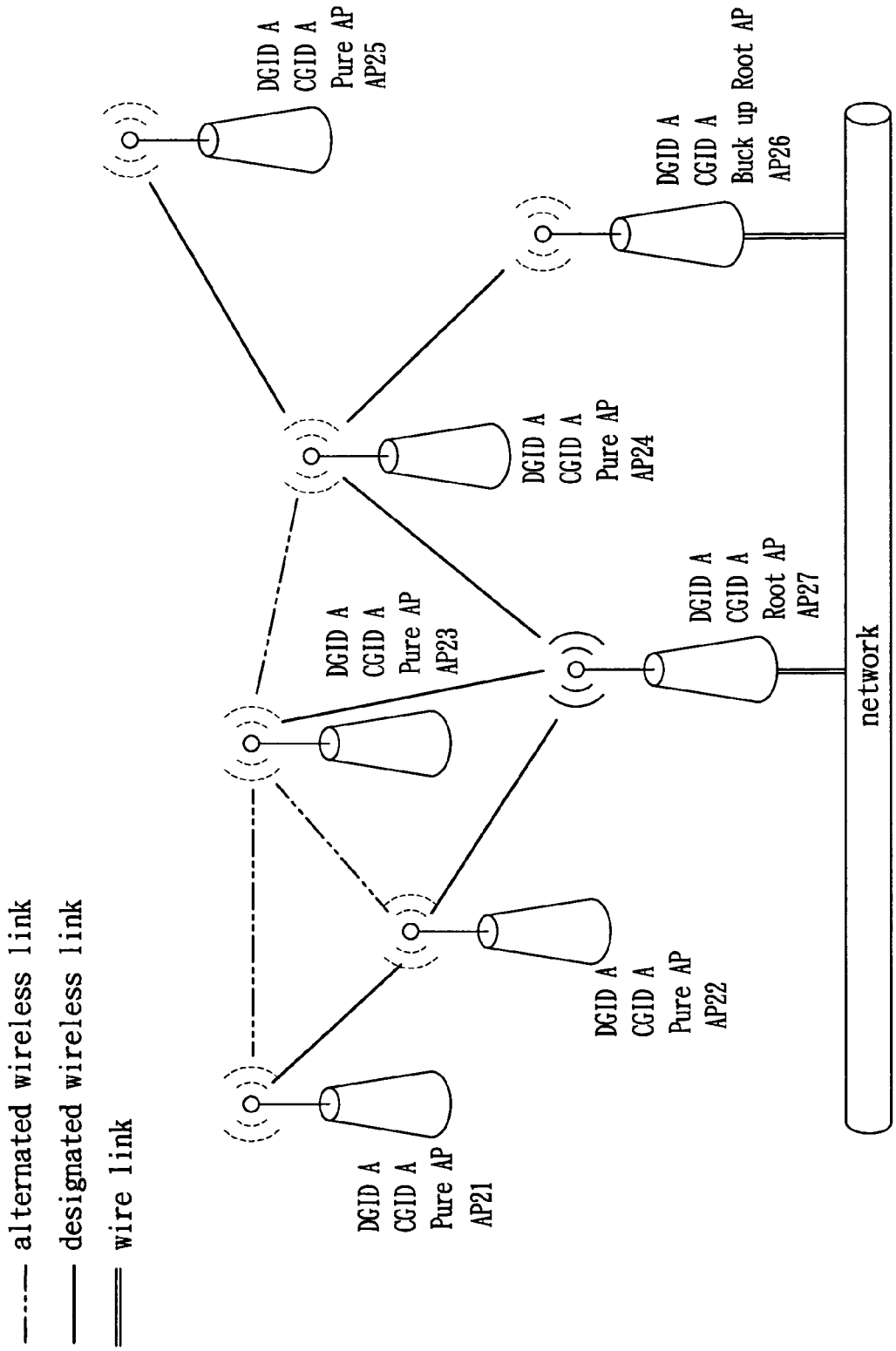
FIG. 4 schematically depicts topology growth among APs in a single group state according to a third preferred embodiment of the invention.

Referring to FIG. 4, a third preferred embodiment of the invention is shown. AP26 can determine whether AP27 exists as the role of Root AP after receiving a probe request frame sent from AP24. This is because communication ranges of AP24 and AP26 are partially overlaid when AP26 has access to wire network as shown in first embodiment. This is why a MACofRootAP is required to exist in an added IE as contemplated by the invention. AP26 thus changes its role as Backup Root AP because AP27 still has the role of Root AP. Established wireless links will be interrupted since the Backup Root AP does not have to provide wireless link services to subsequent APs. At this time, AP26 still can receive a probe request frame sent from AP24. AP26 can immediately replace AP27 as Root AP when AP26 is aware that IE in the probe request frame indicates AP27 being no longer a Root AP. As a result, AP26 can provide wireless link services to subsequent APs and dynamically prevent a loop from creating in real time.

Figure 5:
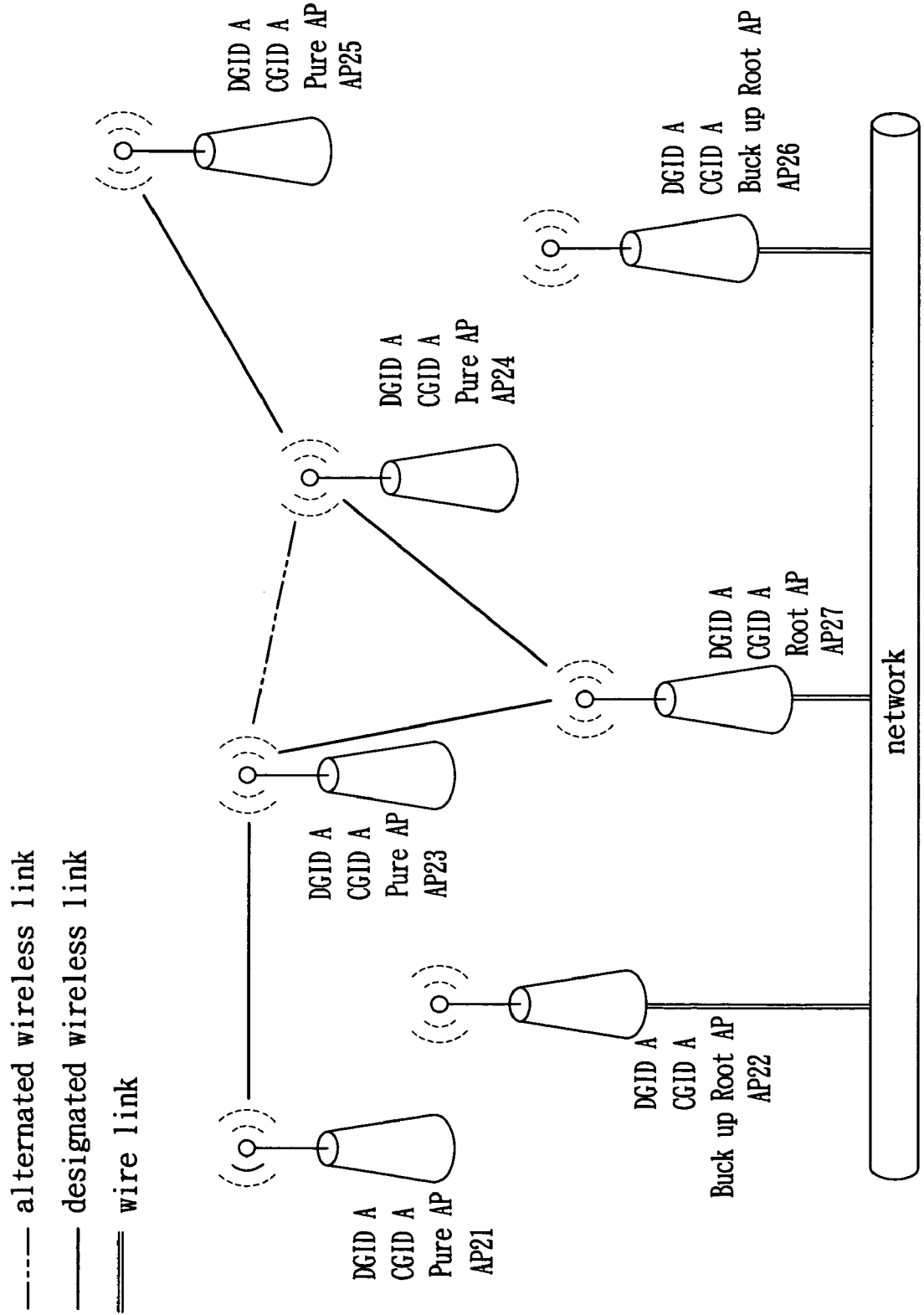
FIG. 5 schematically depicts topology growth among APs in a single group state according to a fourth preferred embodiment of the invention.
Figure 6:
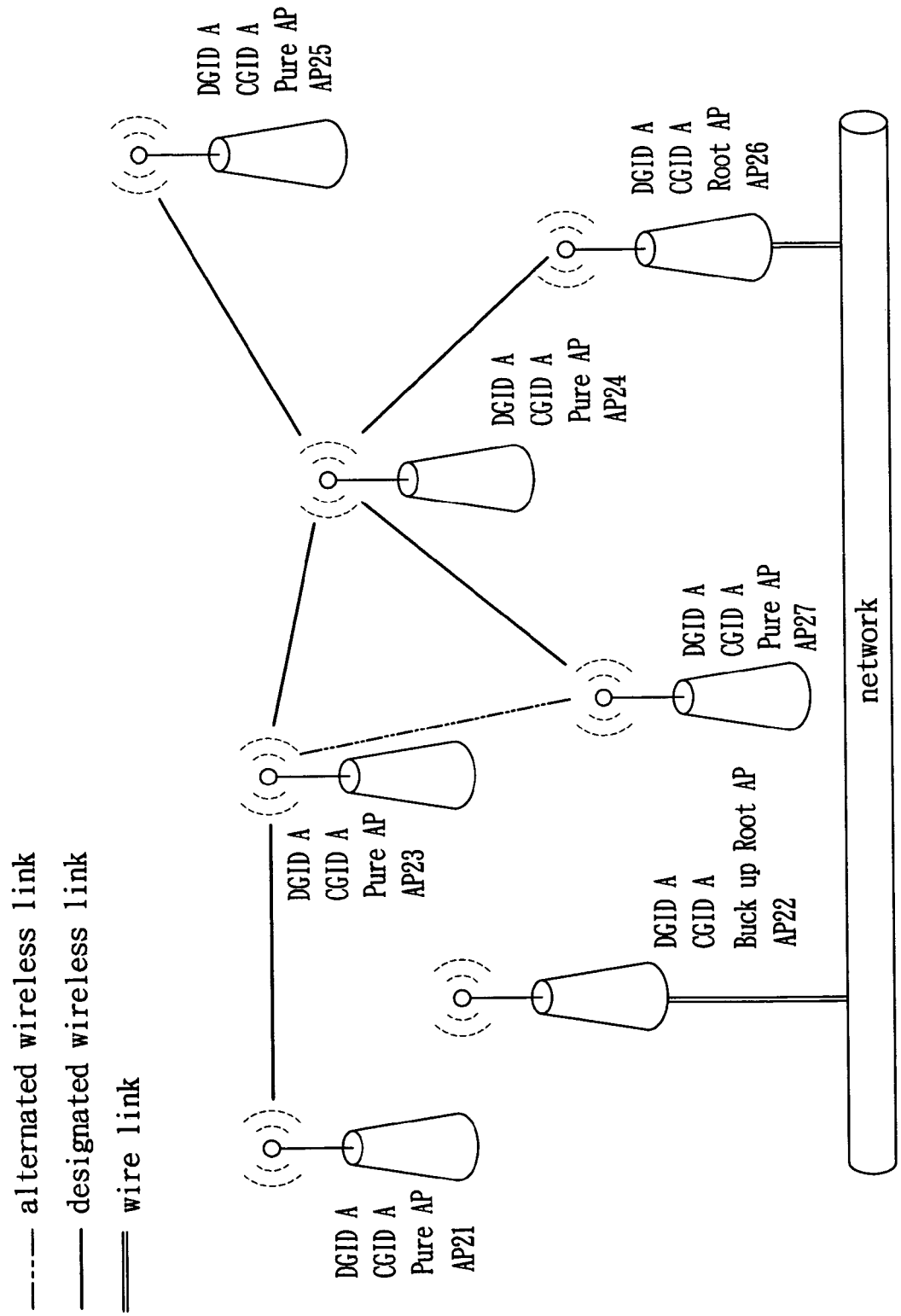
FIG. 6 schematically depicts topology growth among APs in response to disconnecting AP27 from the wire network according to the fourth preferred embodiment of the invention shown in FIG. 5.

Referring to FIG. 5, a fourth preferred embodiment of the invention is shown. In a single group state there are one Root AP (e.g., AP27), two Backup Root APs (e.g., AP22 and AP26), and a plurality of Pure APs (e.g., AP21, AP23, AP24, and AP25). Referring to FIG. 6, in a case of AP27 disconnected from the wire network, one Backup Root AP (e.g., AP26) may immediately change as Root AP, AP27 may immediately change as Pure AP, and another Backup Root AP (e.g., AP22) maintains its Backup Root AP after changing topology. After disconnecting AP27 from wire network, both AP22 and AP26 are directly or indirectly aware that the Root AP does not exist. Also, both AP22 and AP26 can change their roles as Root APs. Thus, both AP22 and AP26 may add a Sequence field in an IE to be sent based on states thereof prior to sending a probe request frame. Similarly, both AP22 and AP26 can receive probe request frames sent from other APs. As shown in FIG. 6, after AP22 directly or indirectly receiving a probe request frame and determining that a Sequence field thereof is senior than a latest state of AP22, AP22 is thus aware that a senior Root AP exists and immediately returns as Backup Root AP. In view of above, no loop is created irrespective of how many APs in a group having access to wire network. Also, wireless links among APs of the group may quickly converge and topology growth is hastened. In addition, a backup mechanism is activated immediately when the topology is tampered. As a result, a Root AP is created in real time for automatically repairing damaged topology, and providing wireless link services to subsequent Pure APs.

Figure 7:
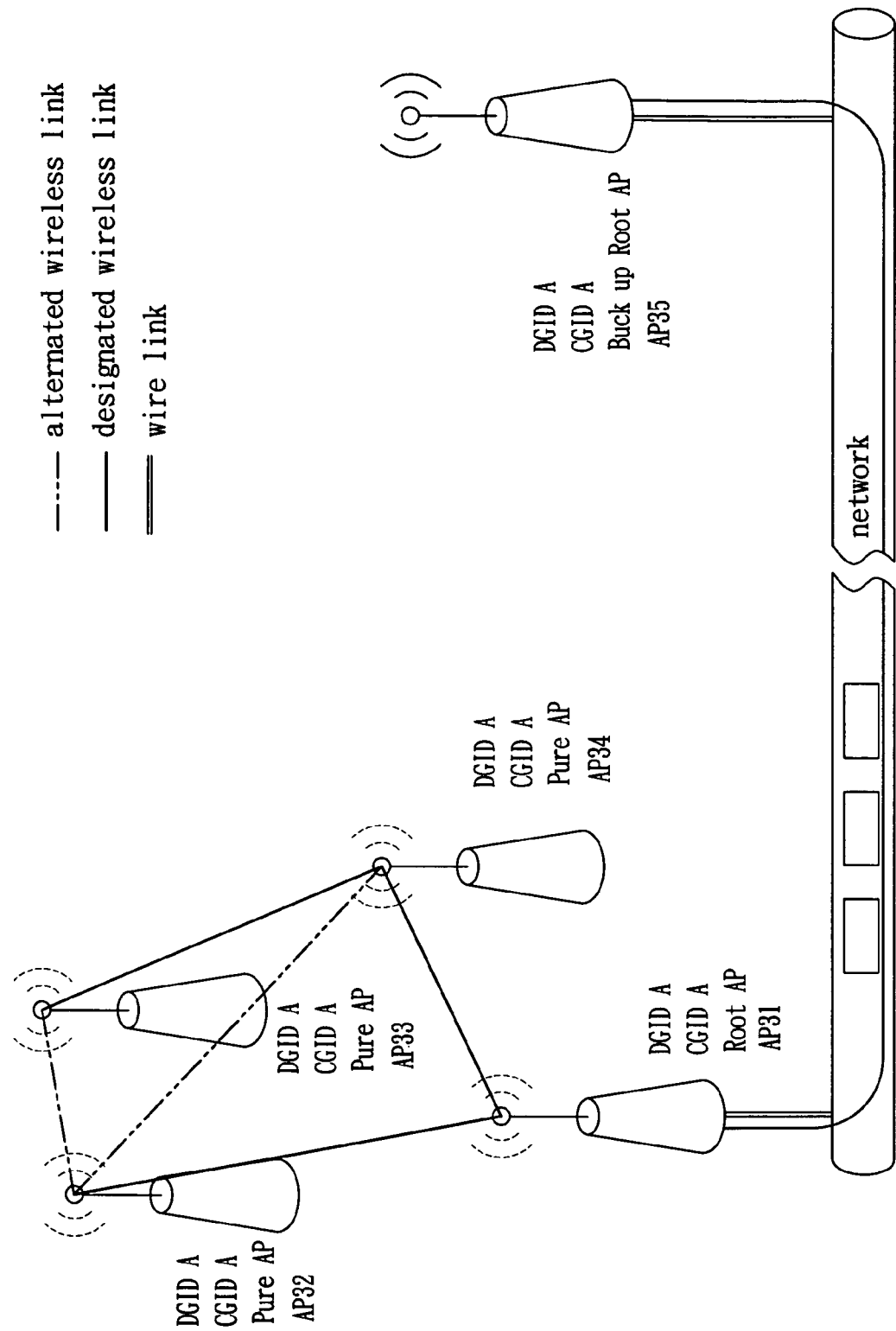
FIG. 7 schematically depicts topology growth among APs in a single group state in response to either disconnecting some APs from the wire network due to long time interference, or out of communication distance therebetween, or some relay pure APs moving out of the system according to a fifth preferred embodiment of the invention.

Referring to FIG. 7, a fifth preferred embodiment of the invention is shown. In a single group state in response to either disconnecting some APs from the wire network due to long time interference, out of communication distance therebetween, or some relay Pure APs moving out of the system one of two APs (e.g., AP31 and AP35) may not directly or indirectly communicate with the other by determining a management frame therefrom wirelessly. Thus, after scanning all channels each of them thinks itself is eligible to be a Root AP. As a result, there are two Root APs in the same group. This state does not create a loop but it may compromise consistency of network management. Thus, AP31 may send a management frame to AP 35 or vice versa for information exchange and negotiation. Negotiation is effected by negotiating Sequence fields of two APs for obtaining a Root AP (e.g., AP31) and a Backup Root AP (e.g., AP35). The difference between the fifth embodiment and the fourth embodiment shown in FIG. 6 as follows. Negotiation is done through wireless network in the fourth embodiment. Only one Root AP (e.g., AP31) is allowed to exist in the same group. Thus, another AP (e.g., AP35) having access to wire network becomes Backup Root AP. Thus, network topology of the system may quickly converge and stabilize when a Root AP exists between AP31 and AP35.

Figure 8:
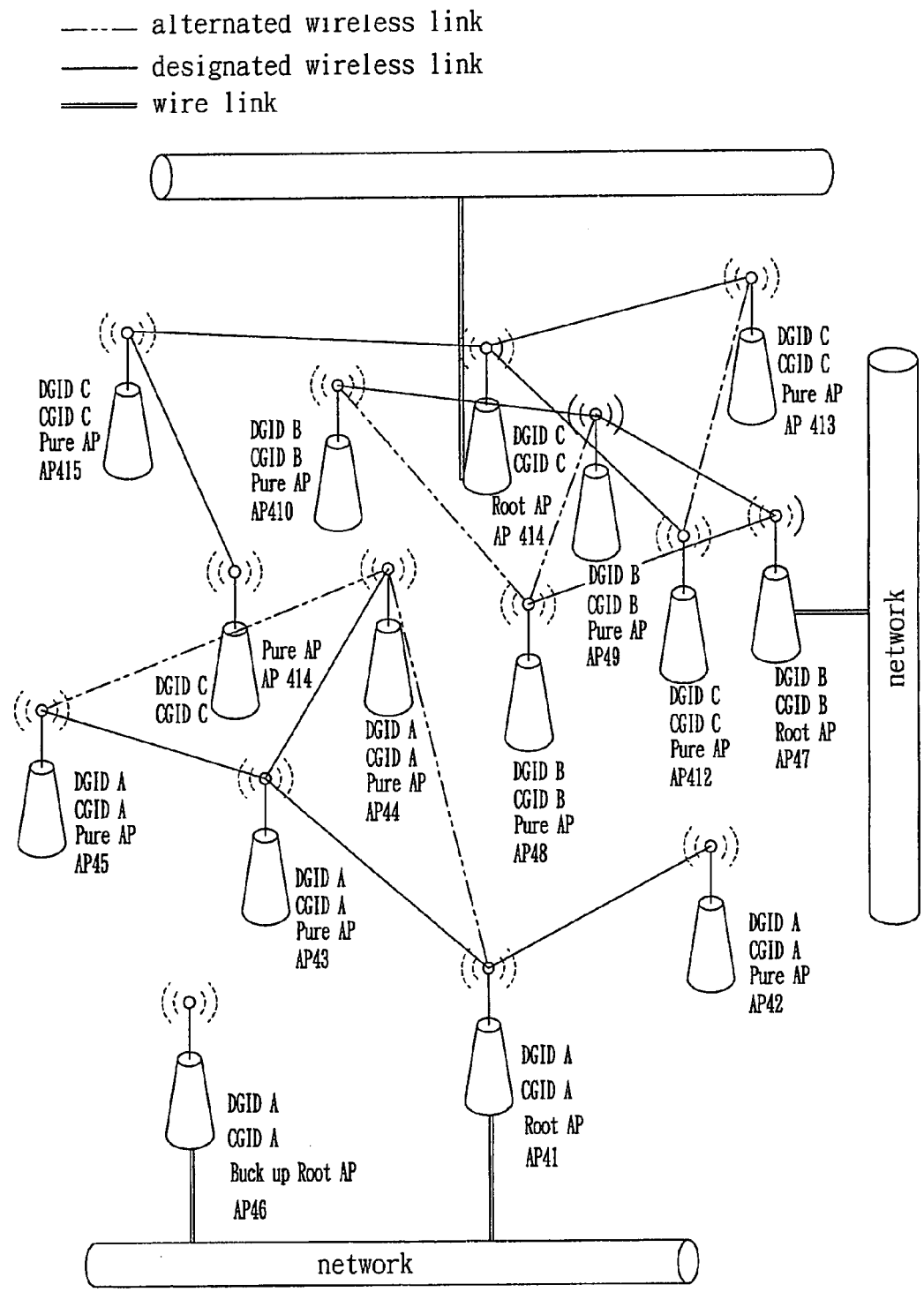
FIG. 8 schematically depicts topology growth among APs in a multiple group state according to a sixth preferred embodiment of the invention.

Referring to FIG. 8, a sixth preferred embodiment of the invention is shown. In a state having groups A, B, and C each has one or more APs having access to wire network in which APs having the same DGID have higher priority of establishing wireless link. Thus, APs having the same DGID can form a topology with APs from other groups being excluded. As such, final roles of AP41 is Root AP and AP46 is Backup Root AP. Their explanation is the same as that described in fourth and fifth embodiments in which seniority can be determined based on Sequence field of the received probe request frame. One AP may become the role of Backup Root AP if a senior Root AP already exists after determination.

Figure 9:
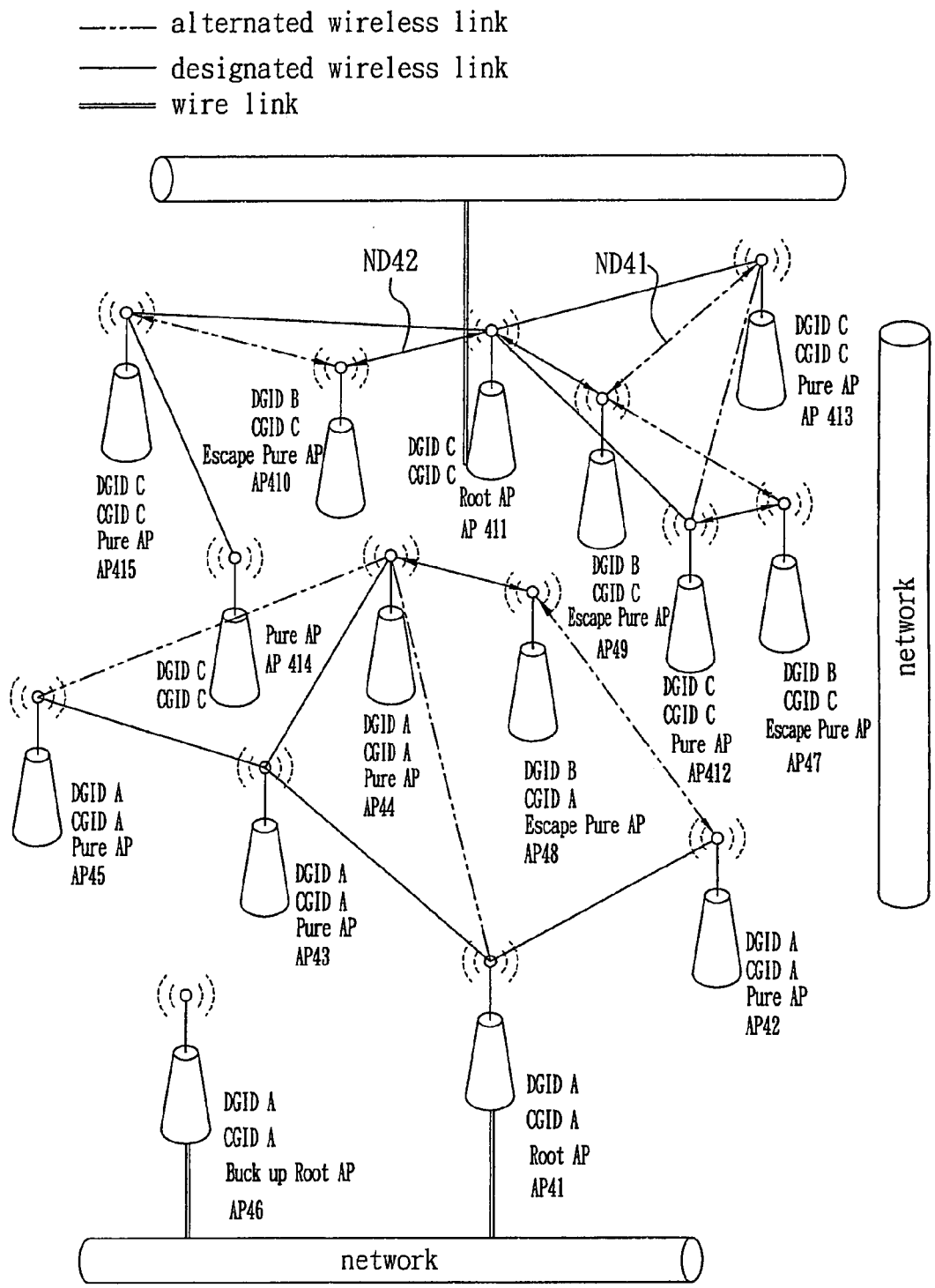
FIG. 9 schematically depicts topology growth among APs in a multiple group state when a wireless link is establishing among APs in an escape mode according to a seventh preferred embodiment of the invention.

Referring to FIG. 9, a seventh preferred embodiment of the invention is shown. As compared with the sixth embodiment of FIG. 8, AP47 may immediately be aware that itself is no more Root AP when Root AP (e.g., AP47) of group B is disconnected from wire network. AP47 then informs other APs of group B by sending a probe request frame. After receiving the probe request frame, each of other APs may be aware that Root AP of group B does not exist as indicated by IE therein. Next, AP47, AP48, AP49, and AP410 search group B in order to find whether there is a Root AP in group B. Next, AP47, AP48, AP49, and AP410 enter escape mode after not finding a Root AP in group B. Entering escape mode means an AP is about to enter a group. Escape mode field means whether an AP is willing to accept an AP having a different DGID, establish a link in escape mode, and establish a link with other groups. After AP47, AP48, AP49, and AP410 entering escape mode, they can receive probe request frames sent from other groups for determining whether another group exists and its state. Thus, CGID can be changed to become a group to be entered. Hence, an AP entering escape mode can establish a link with APs of other groups and in turn accept services provided by other groups. In the embodiment, AP47, AP49, and AP410 enter group C and thus CGID of each AP becomes C, and role of each AP becomes Escape Pure AP with its DGID remained B. Thus, a new alternated wireless link labeled ND41 or a new designated wireless link labeled ND42 is formed among APs. Similarly, AP48 may enter group A by traversing the above procedure. An AP having a CGID of C may enter group A by traversing the above procedure if Root AP of group C is disconnected from wire network. In view of above, the invention can provide an automatic backup mechanism between different groups so as to provide wireless link services to APs of different groups.

Figure 10:
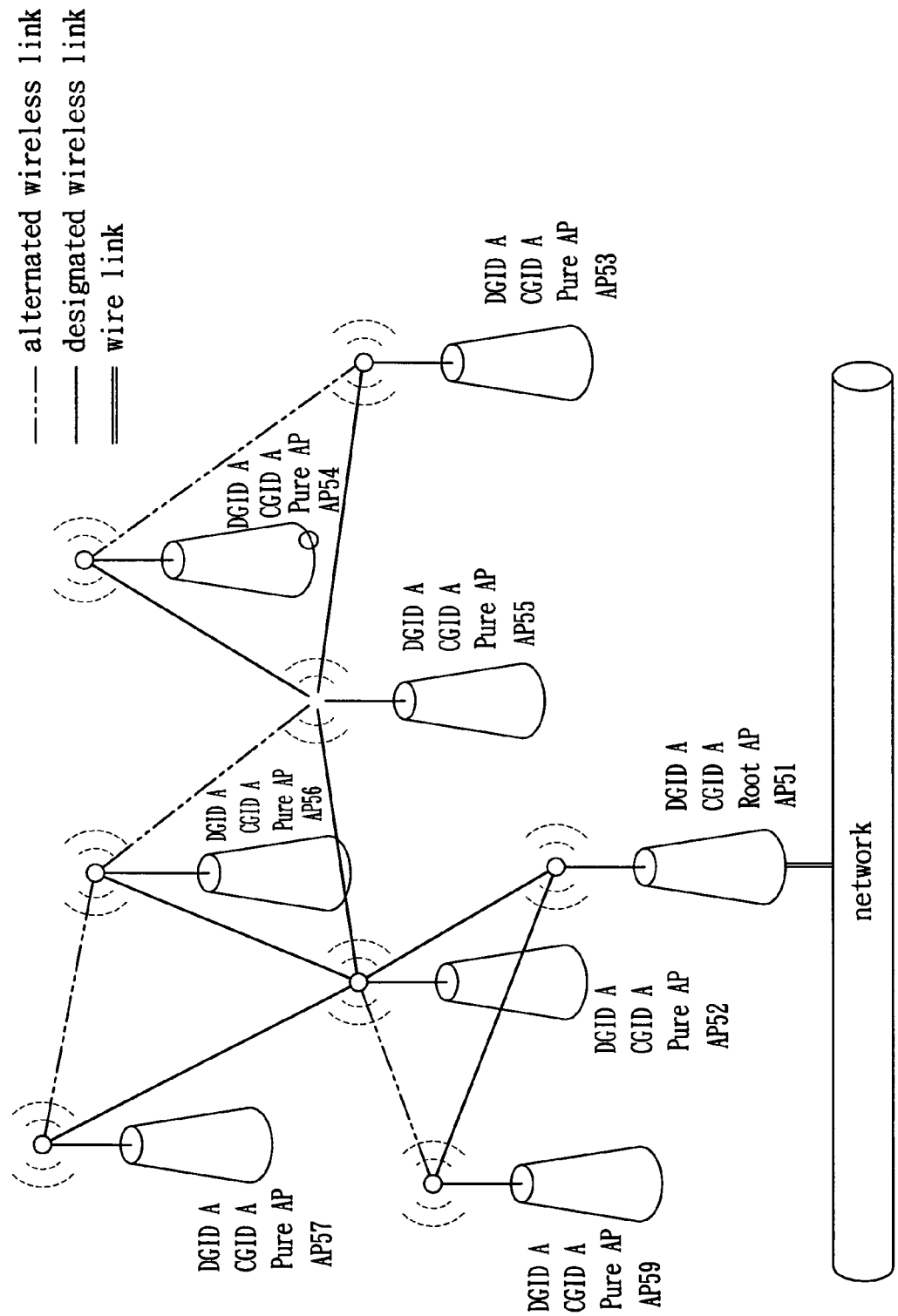
FIG. 10 schematically depicts topology growth among APs in a single group state when APs are set to have a maximum number of wireless links according to an eighth preferred embodiment of the invention.
Figure 11:
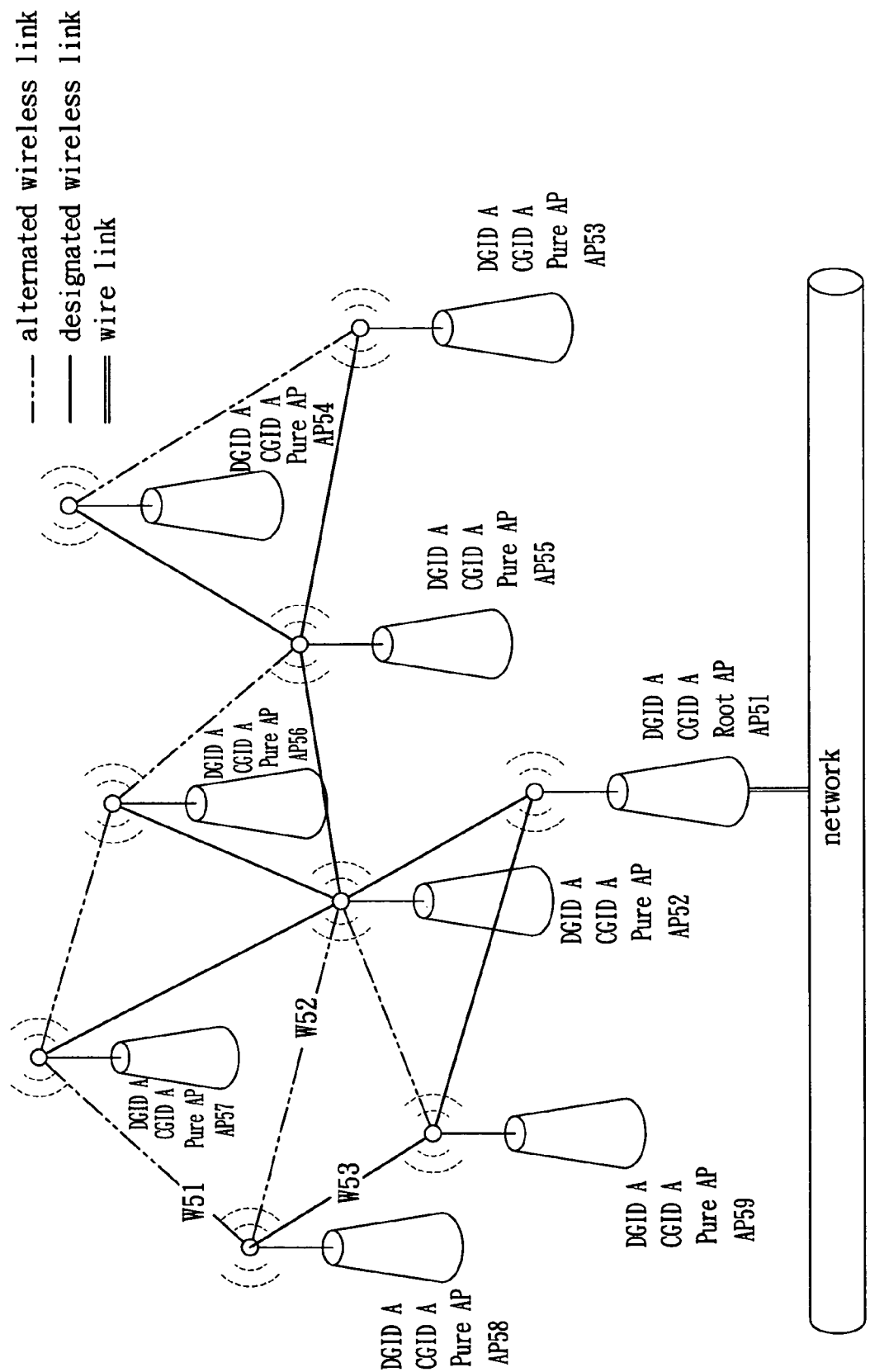
FIG. 11 schematically depicts topology growth among APs when the maximum number of wireless links is indicated in RunOutofVport field in a probe request frame sent from AP according to the eighth preferred embodiment shown in FIG. 10.

Referring to FIG. 10, an eighth preferred embodiment of the invention is shown. In a single group state each AP is set to have a maximum number of wireless links equal to the number of alternated wireless links of AP plus the number of designated wireless links of AP. The maximum number of wireless links is a default if user does not set it. Thus, the maximum number of wireless links set by an AP may vary. Referring to FIG. 10 again, in a case of the maximum number of wireless links set by AP52 being 5 (i.e., value in the established wireless link field), a new AP58 is added as shown in FIG. 11. AP58 has a communication range partially overlaid with that of AP52, AP57, and AP59. The original AP58 may establish a link with AP52, AP57, and AP59 after receiving probe request frames from AP52, AP57, and AP59. However, RunOutofVport field in the probe request frame sent by AP52 indicates that the number of wireless links is full (or no more new wireless link being possible). Thus, a wireless link between AP58 and AP52 is not established. As shown in FIG. 11, label W52 represents a wireless link being impossible of establishing. Hence, only two wireless link labeled W51 and W53 are established after AP58 being stable as shown in FIG. 11. In view of above, it is clear that the invention can limit the number of wireless links including alternated wireless links and designated wireless links according to characteristics and requirements of respective APs and average the number of AP links. As an end, load is balanced and the purpose of effectively utilizing bandwidth is achieved.

Figure 12:
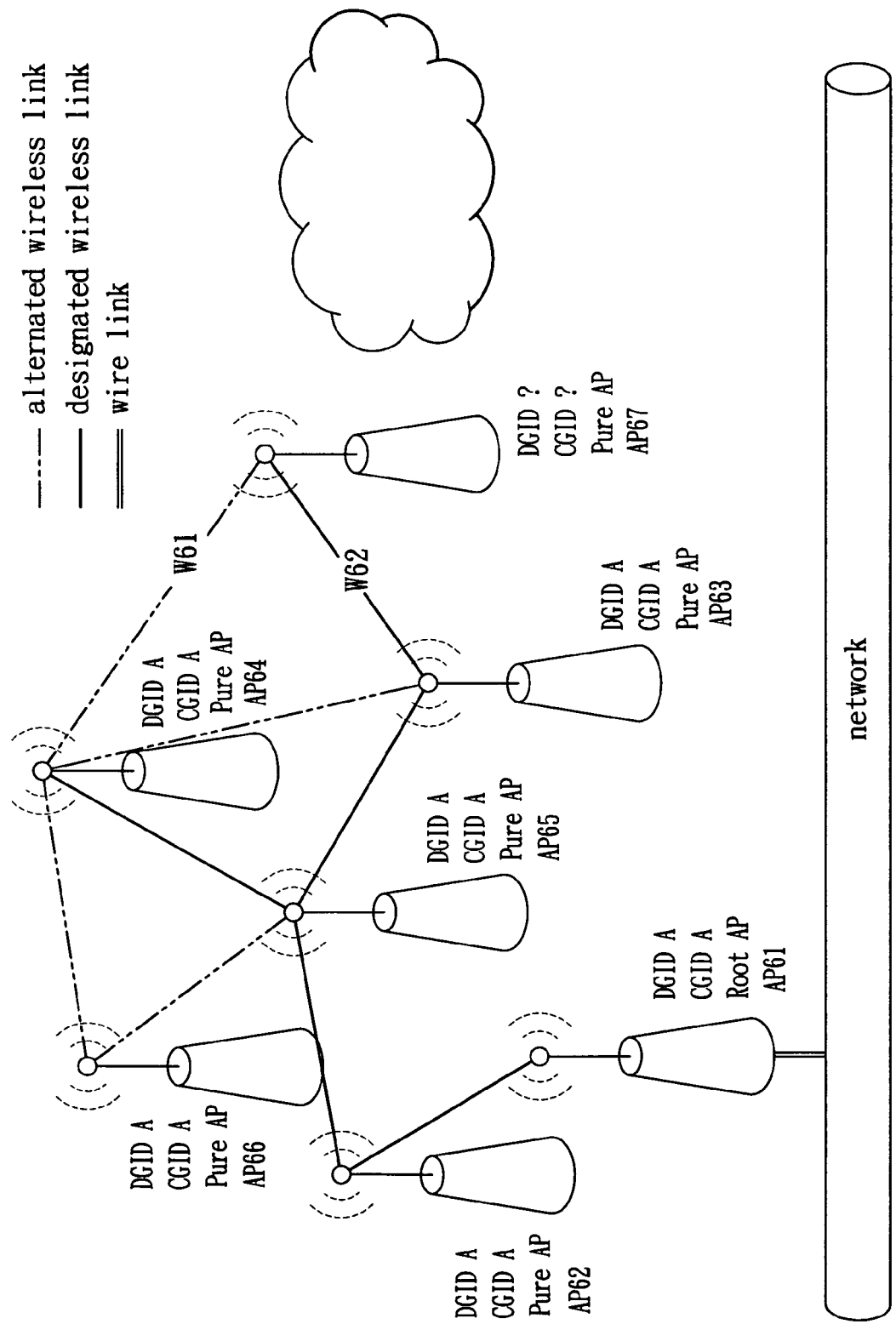
FIG. 12 schematically depicts topology growth among APs in a single group state when some non-root APs are set to prohibit APs of other groups from establishing a wireless link in an escape mode according to a ninth preferred embodiment of the invention.

Referring to FIG. 12, a ninth preferred embodiment of the invention is shown. In a single group state left AP (e.g., AP61) and other APs including AP62, AP63, AP64, AP65, and AP66 form a single group A with stable topology. Among AP61, AP62, AP63, AP64, AP65, and AP66 only AP64 is set to prohibit from establishing a link with APs of other groups in escape mode and the remaining APs are allowed to set to establish link in escape mode. Referring to FIG. 12 again, right AP (e.g., AP67) is one to be about to enter group A in escape mode and AP67 has a communication range partially overlaid with that of AP63 and AP64. But AP64 has been set to prohibit from establishing a link with APs of other groups in escape mode. In a case of AP67 negotiating with AP64 for establishing link and AP64 receiving a probe request frame from AP67, DGID is not A after analyzing. Next, it is determined that AP67 desires to enter group A in escape mode. As shown in FIG. 12, label W61 represents a wireless link being impossible of establishing. Also, after receiving a probe request frame from AP64 and analyzing its escape mode field, AP67 is aware that AP64 has been set to prohibit from establishing a link with APs of other groups in escape mode. Thus, a link between AP67 and AP64 is not established. To the contrary, there is no restriction in AP63. Thus, as shown in FIG. 12, label W62 represents a wireless link being possible of establishing. Eventually, AP67 enters group A in escape mode and in turn is able to have access to the Internet. In view of above, the invention enables respective APs to select a service target. That is, the invention enables APs having different attributes to have the right of selecting service target.

Figure 13:
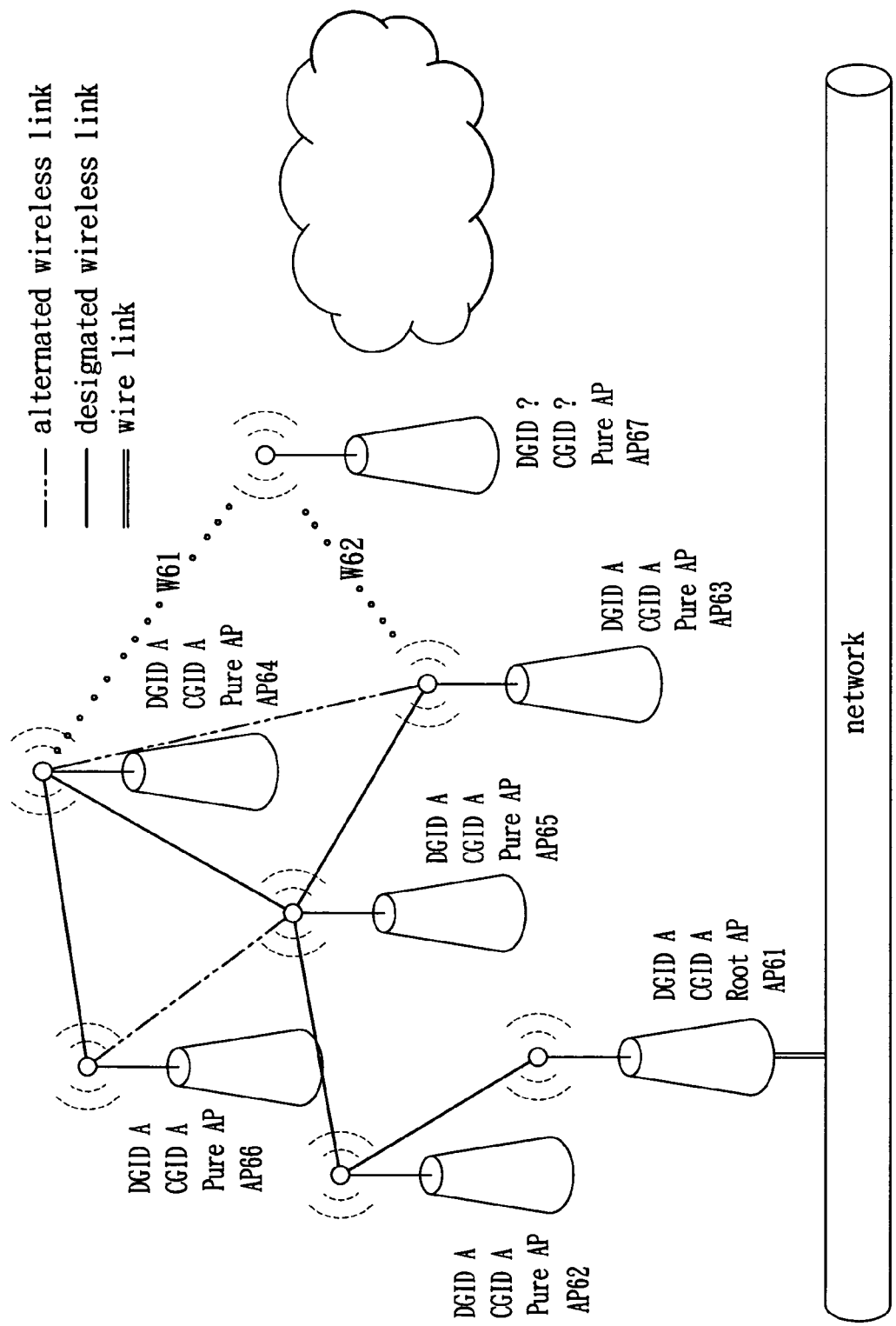
FIG. 13 schematically depicts topology growth among APs in a single group state when root APs are set to prohibit APs of other groups from establishing a wireless link in an escape mode according to a tenth preferred embodiment of the invention.

Referring to FIG. 13, a tenth preferred embodiment of the invention is shown. In a single group state left AP (e.g., AP61) and other APs including AP62, AP63, AP64, AP65, and AP66 form a single group A with stable topology. Among AP61, AP62, AP63, AP64, AP65, and AP66 only AP61 is set to prohibit from establishing a link with APs of other groups in escape mode. In the tenth embodiment, for configuring group A as a private wireless network topology and having setting convenience, only Root AP is set to prohibit from establishing a link with APs of other groups in escape mode and the remaining Pure APs are aware that APs in the group are not allowed to set to establish link with APs set in escape mode by referring an escape mode field value of IE in a probe request frame sent from the Root AP. Also, such information is contained in the escape mode field and is sent via a probe request frame. Thus, AP61, AP62, AP63, AP64, AP65, and AP66 are aware that group A does not accept APs which are about to establish link in escape mode. Referring to FIG. 12 again, right AP (e.g., AP67) is one to be about to enter group A in escape mode and AP67 has a communication range partially overlaid with that of AP63 and AP64. But Root APs of group A have been set to prohibit from establishing a link with APs of other groups in escape mode. Thus, AP67 is not able to negotiate with both AP63 and AP64. As shown in FIG. 13, each of labels W61 and W62 represents a wireless link being impossible of establishing. In the tenth embodiment, both AP63 and AP64 are stable Pure APs. This means that they have received a request indicating that Root AP (e.g., AP61) is set to prohibit from establishing a link with APs of other groups in escape mode. Thus, Root AP will not establish a link with APs incorporating escape mode. Eventually, group A forms a private wireless network topology. In view of above, the invention can easily configure all APs in a single group to not provide services to APs having different attributes. As an end, a private wireless network system is formed.

In conclusion, the invention can enable any AP to maintain information in fields of IE based on its setting and state. Also, information in fields of IE is sent via a management frame. In a case of a management frame sent from any of other APs being received, it is possible of determining operating condition of the other AP based on information in fields of IE. By configuring as this, it is possible of determining whether a physical link with other APs should be established. Further, state of an established physical link can be maintained in real time. Thus, the invention has the following advantages and desired effects.

1. The invention eliminates drawback of wire network of being impossible of implementing in wireless networking, provides a novel topology development system, and effectively integrates wire network and wireless network such that both networks can cooperate well and are compatible with each other.

2. The invention can fully utilizes and integrates wire network. At the same time, the invention can automatically grow a wireless network topology and dynamically repair and expand same in order to quickly converge and eliminate the creation of loop. Thus, no detail setting with respect to each AP is required and increased maintenance complexity and cost due to the number of APs increase or decrease are greatly decreased.

3. The invention introduces the concept of group. By setting DGID on AP, a user may configure APs having the same DGID to have the highest priority of establishing link. As a result, an easy system installation is effected, complexity of wireless topology is greatly reduced, topology development is more promising, and bandwidth decrease is avoided while expanding rapidly.

4. The invention enables APs of the same group to dynamically negotiate a Root AP in real time. Further, an appropriate network topology is formed automatically and quickly based on latest topology state.

5. The invention enables APs of a single group to connect to a wire network or disconnect therefrom in any time so as to effectively and systematically maintain and filter frames for preventing a loop from creating. At the same time, APs of a group have a backup mechanism for supporting one another. Thus, a Root AP can be selected automatically in real time by negotiating in response to disconnecting a Root AP from wire network. Further, the Root AP can provide services to subsequent disconnected APs. Furthermore, the negotiation can be facilitated with the help of wire network. Hence, drawback of being unable to establish a link due to specific conditions in wireless network can be eliminated.

6. The invention enables APs of different groups to automatically provide a backup mechanism for supporting one another. Thus, wireless network topology becomes more flexible and is expansible such that a specific wireless network group not connected to wire network may have access to network through any of other wireless network groups.

7. The invention enables APs to have the right to select whether wireless link services should be provided by groups and easy setting. Thus, all APs of a single group can become APs not adapted to provide services to APs of different groups. As such, APs other than a private wireless network are excluded in order to form a private wireless network and effectively protect a private wireless network and increase its performance.

8. The invention can, according to characteristics and requirements of respective APs, limit the number of wireless links in order average the number of AP links. As an end, load is balanced and the purpose of effectively utilizing bandwidth is achieved.

9. The invention enables an AP to not only provide both WDS and STA functions in a single bandwidth at the same time but also provide both WDS and STA functions in different bandwidths. As a result, dual band service mode is provided, bandwidth is fully used, and wireless network performance is greatly improved.

While the invention herein disclosed has been described by means of specific embodiments, numerous modifications and variations could be made thereto by those skilled in the art without departing from the scope and spirit of the invention set forth in the claims.

What is claimed is:

1. A wireless routing mechanism for same group and inter-group operations covering both a wire network and a wireless network, the wireless routing mechanism being implemented in a wireless distribution system (WDS) mode such that in response to sending a management frame having an information element (IE) from an access point (AP), each of other APs receiving the management frame is capable of automatically establishing a wireless network topology in a wire network infrastructure based on information contained in a plurality of fields of the IE, the IE comprising:

an Element ID field for storing an ID of the IE;

a Length field for storing a total length of the IE;

a Current Group ID (CGID) field for representing a group ID of one AP when the wireless routing mechanism performs such that other APs are adapted to be aware of whether a specific group exists and operates;

a Role of AP field for representing a current role of the AP when the wireless routing mechanism performs;

a Sequence field for representing a sequence number of a latest available IE and for indicating an existence of a specific group; and a MACofRootAP field for representing a MAC value of a root AP in the group.

2. The wireless routing mechanism of claim 1, wherein the Role of AP field comprises:

a Root AP for indicating an AP being in a state of connecting to the wire network and enabling the AP to provide services to the subsequent disconnected APs for establishing a wireless link; or a Backup Root AP for indicating an AP being in a state of connecting to the wire network and disabling the AP to provide services to the subsequent disconnected APs for establishing a wireless link; or a Pure AP for indicating an AP being in a state of disconnecting from the wire network and causing the AP to connect to the wire network via services provided by other Root APs.

3. The wireless routing mechanism of claim 2, wherein the IE further comprises a Default Group ID (DGID) field for representing a group ID of a group that an AP desires to enter such that a plurality of different APs with the same DGID have the highest priority of establishing a wireless link therebetween.

4. The wireless routing mechanism of claim 3, wherein the Role of AP field represents a role played by an AP in a specific group, the role including:

an Escape Pure AP being in a state of connecting to the wire network via other APs having different DGID fields; or an Initial Pure AP being in a transient state of not having established a wireless link or the established wireless link has interrupted.

5. The wireless routing mechanism of claim 4, wherein the IE further comprises an Escape field for representing whether an AP is capable of accepting to establish a wireless link with another AP having a different DGID.

6. The wireless routing mechanism of claim 5, wherein the Escape field is adapted to an acceptable escape mode, an unacceptable escape mode, or all APs in the same group are in the unacceptable escape mode.

7. The wireless routing mechanism of claim 1, wherein the IE further comprises a RunOutofVport field for representing whether an AP is capable of establishing one or more physical wireless links.

8. The wireless routing mechanism of claim 7, wherein an AP sending the management frame is adapted to maintain the value of each field of the IE based on setting and state of the AP.

9. The wireless routing mechanism of claim 8, wherein the IE further comprises a Default Group ID (DGID) field for representing a group ID of a group that an AP desires to enter such that a plurality of different APs with the same DGID have the highest priority of establishing a wireless link therebetween.

10. The wireless routing mechanism of claim 9, wherein the Role of AP field represents a role played by an AP in a specific group, the role including:

an Escape Pure AP being in a state of connecting to the wire network via other APs having different DGID fields; or an Initial Pure AP being in a transient state of not having established a wireless link or the established wireless link has interrupted.

11. The wireless routing mechanism of claim 10, wherein the IE further comprises an Escape field for representing whether an AP is capable of accepting to establish a wireless link with another AP having a different DGID.

12. The wireless routing mechanism of claim 11, wherein the Escape field is adapted to an acceptable escape mode, an unacceptable escape mode, or all APs in the same group are in the unacceptable escape mode.

13. The wireless routing mechanism of claim 7, wherein the value of each field of the IE is adapted to enable an AP receiving the management frame to determine an operating state of other APs for determining whether a physical link is to be established.

14. The wireless routing mechanism of claim 13, wherein the IE further comprises a Default Group ID (DGID) field for representing a group ID of a group that an AP desires to enter such that a plurality of different APs with the same DGID have the highest priority of establishing a wireless link therebetween.

15. The wireless routing mechanism of claim 14, wherein the Role of AP field represents a role played by an AP in a specific group, the role including:

an Escape Pure AP being in a state of connecting to the wire network via other APs having different DGID fields; or an Initial Pure AP being in a transient state of not having established a wireless link or the established wireless link has interrupted.

16. The wireless routing mechanism of claim 15, wherein the IE further comprises an Escape field for representing whether an AP is capable of accepting to establish a wireless link with another AP having a different DGID.

17. The wireless routing mechanism of claim 16, wherein the Escape field is adapted to an acceptable escape mode, an unacceptable escape mode, or all APs in the same group are in the unacceptable escape mode.

18. The wireless routing mechanism of claim 7, wherein the IE further comprises a Default Group ID (DGID) field for representing a group ID of a group that an AP desires to enter such that a plurality of different APs with the same DGID have the highest priority of establishing a wireless link therebetween.

19. The wireless routing mechanism of claim 18, wherein the Role of AP field represents a role played by an AP in a specific group, the role including:

an Escape Pure. AP being in a state of connecting to the wire network via other APs having different DGID fields; or an Initial Pure AP being in a transient state of not having established a wireless link or the established wireless link has interrupted.

20. The wireless routing mechanism of claim 19, wherein the IE further comprises an Escape field for representing whether an AP is capable of accepting to establish a wireless link with another AP having a different DGID.

21. The wireless routing mechanism of claim 20, wherein the Escape field is adapted to an acceptable escape mode, an unacceptable escape mode, or all APs in the same group are in the unacceptable escape mode.

22. The wireless routing mechanism of claim 1, wherein a value of the Sequence field is adapted to enable the AP receiving the management frame to negotiate for obtaining a unique Root AP based on whether the value of the Sequence field of the IE is more senior.

23. The wireless routing mechanism of claim 22, wherein the IE further comprises a Default Group ID (DGID) field for representing a group ID of a group that an AP desires to enter such that a plurality of different APs with the same DGID have the highest priority of establishing a wireless link therebetween.

24. The wireless routing mechanism of claim 23, wherein the Role of AP field represents a role played by an AP in a specific group, the role including:
   an Escape Pure AP being in a state of connecting to the wire network via other APs having different DGID fields; or
   an initial Pure AP being in a transient state of not having established a wireless link or the established wireless link has interrupted.

25. The wireless routing mechanism of claim 24, wherein the IE further comprises an Escape field for representing whether an AP is capable of accepting to establish a wireless link with another AP having a different DGID.

26. The wireless routing mechanism of claim 25, wherein the Escape field is adapted to an acceptable escape mode, an unacceptable escape mode, or all APs in the same group are in the unacceptable escape mode.

27. The wireless routing mechanism of claim 1, wherein the Role of AP field is a Hello field for representing which role of an AP is when the AP is sending the IE.

28. The wireless routing mechanism of claim 27, wherein the IE further comprises a Default Group ID (DGID) field for representing a group ID of a group that an AP desires to enter such that a plurality of different APs with the same DGID have the highest priority of establishing a wireless link therebetween.

29. The wireless routing mechanism of claim 28, wherein the Role of AP field represents a role played by an AP in a specific group, the role including:
   an Escape Pure AP being in a state of connecting to the wire network via other APs having different DGID fields; or
   an Initial Pure AP being in a transient state of not having established a wireless link or the established wireless link has interrupted.

30. The wireless routing mechanism of claim 29, wherein the IE further comprises an Escape field for representing whether an AP is capable of accepting to establish a wireless link with another AP having a different DGID.

31. The wireless routing mechanism of claim 30, wherein the Escape field is adapted to an acceptable escape mode, an unacceptable escape mode, or all APs in the same group are in the unacceptable escape mode.

32. The wireless routing mechanism of claim 1, wherein the IE further comprises a Default Group ID (DGID) field for representing a group ID of a group that an AP desires to enter such that a plurality of different APs with the same DGID have the highest priority of establishing a wireless link therebetween.

33. The wireless routing mechanism of claim 32, wherein the Role of AP field represents a role played by an AP in a specific group, the role including:
   an Escape Pure AP being in a state of connecting to the wire network via other APs having different DGID fields; or
   an Initial Pure AP being in a transient state of not having established a wireless link or the established wireless link has interrupted.

34. The wireless routing mechanism of claim 33, wherein the IE further comprises an Escape field for representing whether an AP is capable of accepting to establish a wireless link with another AP having a different DGID.

35. The wireless routing mechanism of claim 34, wherein the Escape field is adapted to an acceptable escape mode, an unacceptable escape mode, or all APs in the same group are in the unacceptable escape mode.

36. A wireless routing mechanism for same group and inter-group operations covering both a wire network and a wireless network, the wireless routing mechanism being implemented in a WDS mode such that in response to sending a management frame having an IE from an AP, each of other APs receiving the management frame is capable of automatically establishing a wireless network topology in a wire network infrastructure based on information contained in a plurality of fields of the IE, the information comprising:
   an ID of the IE;
   a Current Group ID (CGID) field for representing a group ID of one AP when the wireless routing mechanism performs such that other APs are adapted to be aware of whether a specific group exists and operates;
   a role for representing a current role of the AP when the wireless routing mechanism performs;
   a sequence for representing a sequence number of a latest available IE and for indicating an existence of a specific group; and
   means for representing a MAC value of a root AP in the group.

37. The wireless routing mechanism of claim 36, wherein the role comprises:
   a Root AP for indicating an AP being in a state of connecting to the wire network and enabling the AP to provide services to the subsequent disconnected APs for establishing a wireless link; or
   a Backup Root AP for indicating an AP being in a state of connecting to the wire network and disabling the AP to provide services to the subsequent disconnected APs for establishing a wireless link; or
   a Pure AP for indicating an AP being in a state of disconnecting from the wire network and causing the AP to connect to the wire network via services provided by other Root APs.

38. The wireless routing mechanism of claim 37, wherein the information further comprises a Default Group ID (DGID) field for representing a group ID of a group that an AP desires to enter such that a plurality of different APs with the same DGID have the highest priority of establishing a wireless link therebetween.

39. The wireless routing mechanism of claim 38, wherein the role represents:
   an Escape Pure AP being in a state of connecting to the wire network via other APs having different DGID fields; or
   an Initial Pure AP being in a transient state of not having established a wireless link or the established wireless link has interrupted.

40. The wireless routing mechanism of claim 39, wherein the information further comprises an Escape field for representing whether an AP is capable of accepting to establish a wireless link with another AP having a different DGID.

41. The wireless routing mechanism of claim 36, wherein the information further comprises a value for representing whether an AP is capable of establishing one or more physical wireless links.

42. The wireless routing mechanism of claim 41, wherein an AP sending the management frame is adapted to maintain the information based on setting and state of the AP.

43. The wireless routing mechanism of claim 42, wherein the information further comprises a Default Group ID (DGID) field for representing a group ID of a group that an AP desires to enter such that a plurality of different APs with the same DGID have the highest priority of establishing a wireless link therebetween.

44. The wireless routing mechanism of claim 43, wherein the role represents:
   an Escape Pure AP being in a state of connecting to the wire network via other APs having different DGID fields; or
   an Initial Pure AP being in a transient state of not having established a wireless link or the established wireless link has interrupted.

45. The wireless routing mechanism of claim 44, wherein the information further comprises an Escape field for representing whether an AP is capable of accepting to establish a wireless link with another AP having a different DGID.

46. The wireless routing mechanism of claim 41, wherein the information is adapted to enable an AP receiving the management frame to determine an operating state of other APs for determining whether a physical link is to be established.

47. The wireless routing mechanism of claim 46, wherein the information further comprises a Default Group ID (DGID) field for representing a group ID of a group that an AP desires to enter such that a plurality of different APs with the same DGID have the highest priority of establishing a wireless link therebetween.

48. The wireless routing mechanism of claim 47, wherein the role represents:
   an Escape Pure AP being in a state of connecting to the wire network via other APs having different DGID fields; or
   an Initial Pure AP being in a transient state of not having established a wireless link or the established wireless link has interrupted.

49. The wireless routing mechanism of claim 48, wherein the information further comprises an Escape field for representing whether an AP is capable of accepting to establish a wireless link with another AP having a different DGID.

50. The wireless routing mechanism of claim 41, wherein the information further comprises a Default Group ID (DGID) field for representing a group ID of a group that an AP desires to enter such that a plurality of different APs with the same DGID have the highest priority of establishing a wireless link therebetween.

51. The wireless routing mechanism of claim 50, wherein the role represents:
   an Escape Pure AP being in a state of connecting to the wire network via other APs having different DGID fields; or
   an Initial Pure AP being in a transient state of not having established a wireless link or the established wireless link has interrupted.

52. The wireless routing mechanism of claim 51, wherein the information further comprises an Escape field for representing whether an AP is capable of accepting to establish a wireless link with another AP having a different DGID.

53. The wireless routing mechanism of claim 36, wherein the sequence is adapted to enable the AP receiving the management frame to negotiate for obtaining a unique Root AP based on whether the Sequence is more senior.

54. The wireless routing mechanism of claim 53, wherein the information further comprises a Default Group ID (DGID) field for representing a group ID of a group that an AP desires to enter such that a plurality of different APs with the same DGID have the highest priority of establishing a wireless link therebetween.

55. The wireless routing mechanism of claim 54, wherein the role represents:
   an Escape Pure AP being in a state of connecting to the wire network via other APs having different DGID fields; or
   an Initial Pure AP being in a transient state of not having established a wireless link or the established wireless link has interrupted.

56. The wireless routing mechanism of claim 55, wherein the information further comprises an Escape field for representing whether an AP is capable of accepting to establish a wireless link with another AP having a different DGID.

57. The wireless routing mechanism of claim 36, wherein the information further comprises a Default Group ID (DGID) field for representing a group ID of a group that an AP desires to enter such that a plurality of different APs with the same DGID have the highest priority of establishing a wireless link therebetween.

58. The wireless routing mechanism of claim 57, wherein the role represents:
   an Escape Pure AP being in a state of connecting to the wire network via other APs having different DGID fields; or
   an Initial Pure AP being in a transient state of not having established a wireless link or the established wireless link has interrupted.

59. The wireless routing mechanism of claim 58, wherein the information further comprises an Escape field for representing whether an AP is capable of accepting to establish a wireless link with another AP having a different DGID.

* * * * *